United States Patent [19]

Geier

[11] 4,239,179
[45] Dec. 16, 1980

[54] QUANTITY CONTROL VALVE FOR CONTROLLING THE QUANTITY OF A PRESSURE MEDIUM

[76] Inventor: Roland Geier, Viale Europa 72a, I-25100 Brescia, Italy

[21] Appl. No.: 933,435

[22] Filed: Aug. 14, 1978

[30] Foreign Application Priority Data

Aug. 17, 1977 [DE] Fed. Rep. of Germany ....... 2737153

[51] Int. Cl.³ .............................................. F16K 31/04
[52] U.S. Cl. ...................................... 251/38; 251/133
[58] Field of Search ...................... 251/30, 42, 43, 44, 251/38, 138, 130, 133

[56] References Cited

U.S. PATENT DOCUMENTS

| | | | |
|---|---|---|---|
| 1,630,212 | 5/1927 | Overton | 251/138 X |
| 2,974,679 | 3/1961 | Heller | 251/38 X |
| 3,080,952 | 3/1963 | Carlstedt | 251/133 X |
| 3,405,906 | 10/1968 | Keller | 251/38 X |
| 3,908,959 | 9/1975 | Fichtner | 251/133 |

FOREIGN PATENT DOCUMENTS 1084998  7/1960  Fed. Rep. of Germany ............. 251/44
1550516  4/1970  Fed. Rep. of Germany .......... 251/133

Primary Examiner—William R. Cline
Attorney, Agent, or Firm—Gifford, VanOphem, Sheridan & Sprinkle

[57] ABSTRACT

In a quantity control valve for controlling the quantity of a pressure medium, the valve spindle being axially movably guided in a bush fixedly disposed in a housing and coacting with a nut included in the gear train, the valve spindle also being connected to a position piston slidably adjustable within a sleeve having a control opening, the sleeve being rigidly attached to a valve closure, a compression spring bearing on one side against the housing and on the other side against the valve closure, the valve closure being stepped within the range of its valve seat in defining an annular chamber, a radial connection leading to a central conduit in the valve closure and opening out into a chamber receiving a position piston, a non-return valve in the duct communicating with the control opening, and a pressure medium supply duct connected to the annular chamber about the valve seat.

2 Claims, 2 Drawing Figures

QUANTITY CONTROL VALVE FOR CONTROLLING THE QUANTITY OF A PRESSURE MEDIUM

BACKGROUND TO THE INVENTION

In die-casting machines, use is made of valves that serve, on the one hand, for varying the pressure and, on the other, for varying the through-flow quantity of the pressure medium. There is a demand for such valves which allow control of relatively large masses of pressure medium while requiring only small servo forces and being relatively simple in construction and comparatively cheap to produce.

BRIEF SUMMARY OF THE INVENTION

The requirement is met in the invention by the provision of a valve for controlling the pressure medium in a die-casting machine or the like, where the valve closure member is adjustable by means of a threaded spindle, and in which there is provided an electric motor, operative to produce angular rotation in either sense of rotation, and connected to the valve spindle by a gearing mechanism, the sense of rotation provided by the electric motor and the angular travel thereof being presettable according to an automatic switching program. A pulse-controlled step motor may advantageously be employed as the electric motor. In many cases, however, a disc motor, controllable by means of a travel setter, can also be used.

If a step motor is used, the stroke is set by the quantity or the pressure of the pressure medium as preselected through the number of pulses in a pulse generator, so that the motor performs the individual steps in a temporal succession and, through a mechanical gearing, converts the rotation into an axial adjusting displacement of the valve closure member.

If a motion pick-up is used co-operating with the adjusting spindle precise regulation becomes possible.

With a valve according to the invention, still further steps can be programmed over a predetermined travel or a predetermined time, so that the valve adjustment can follow any desired curve.

If the valve according to the invention is to be used as a pressure valve, it is imperative to use a design where the threaded spindle is guided in its axial movements relative to a stationary bush built into the valve casing and co-acts with a nut included in the gear train, as well as acts as a counter-bearing for a spring for exerting pressure on the valve closure member on the side opposite to the valve seat. The pressure medium is supplied to the side facing away from the pessure spring and is withdrawn from the side facing towards the pressure spring. Here it is of further advantage if the nut is provided with external teeth and is mounted in the valve casing so as to be rotatable on both sides thereof, the nut co-acting with the remaining gearing through its external teeth.

If the valve according to the invention is to be used as a quantity control valve, it is of advantage so to design it that the threaded spindle is guided in its axial movements relative to the stationary bush built into the valve housing and co-acts with a nut included in the gear train, but is also connected to a position piston, which is adjustably slidable in a sleeve having a control opening it is further advantageous for the pressure spring to bear on the one side against the valve casing and on the other against the valve closure member. The valve closure member is stepped within the range of the valve seating for forming an annular space in the valve housing, with a radial opening leading to a passage provided in the valve closure member, the passage opens out into the chamber which receives the position piston. A controllable non-return valve is built into the duct communicating with the control opening, and the pressure medium supply duct is connected to the annular chamber about the valve seat.

It is also advantageous if, in the construction as a quantity control valve, there is provided a radial duct leading from the central conduit to the spring chamber, and an axial through bore is provided in the position piston.

The quantity control valve may be employed both for controlling the pump throughput quantity and for controlling the storage quantity. The adjustment can then be effected by an electric preselector either in steps or in percentages of the supply quantity.

In construction as a pressure valve, the value adjustment may also be in terms of a percentage of the maximal pressure or the steps may be directly calibrated in terms of pressure heights.

The quantity control valve according to the invention makes it possible to control the quantity of the pressure medium, the servo forces being extremely small and the adjustment itself being sensitive and reliable, while the construction is robust and relatively low in production cost.

DESCRIPTION OF THE PREFERRED EMBODIMENTS

Figure 1:
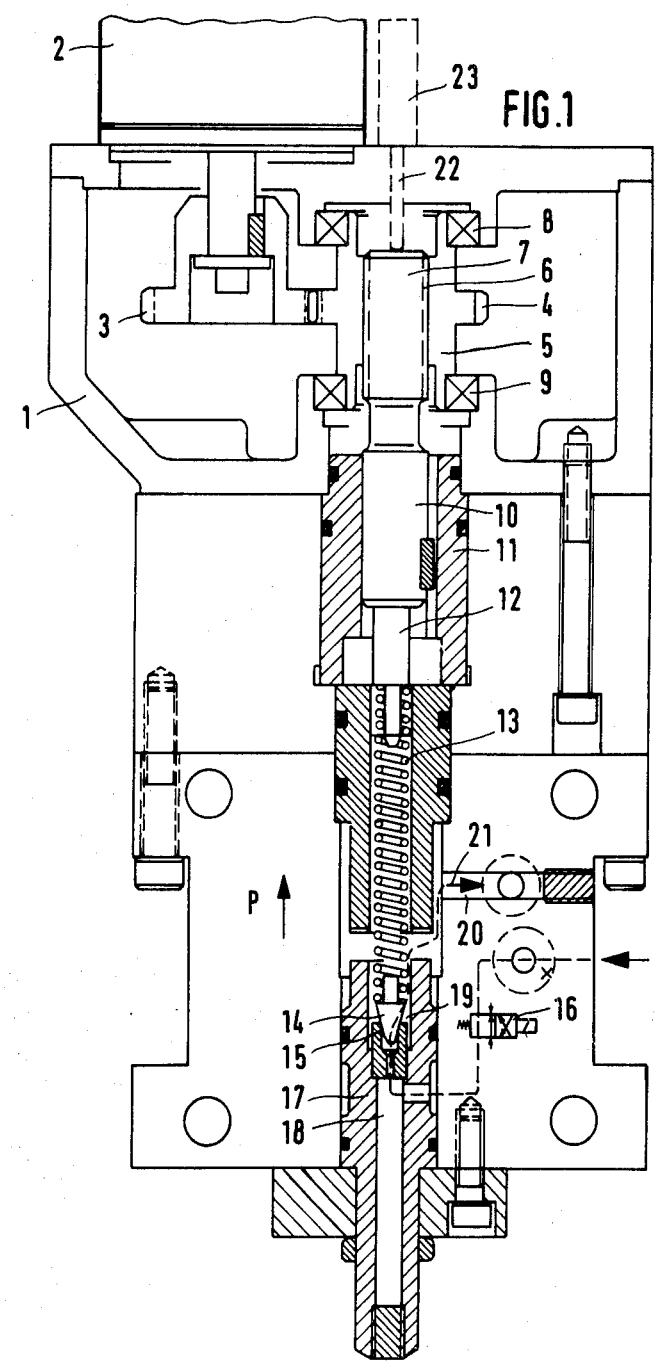
FIG. 1 is a schematic side view, in partial axial cross-section, of a pressure valve in accordance with the invention.

In the embodiment illustrated in FIG. 1, an electric motor 2 is connected to a housing 1. The motor drives, by means of a pinion 3, the peripheral teeth 4 of a nut 5, which co-acts, through its inner threading 6, with a threaded spigot 7. The nut 5 is rotatably mounted in housing 1 by means of bearings 8 and 9. The threaded spigot 7 is guided with a smooth portion 10 thereof which is axially movably in a bush 11 which is rigidly fixed in the housing 1 and is supported with its free end 12 seated on a helical spring 13. At its opposite end, helical spring 13 seats on a valve closure member 14 formed as a valve cone co-operating with a valve seat 15.

The pressure oil passes through a travel-limiting valve 16, which serves to determine the highest pressure, and into the preliminary control duct 18 of a valve pipe 17. If motor 2, which may be formed as a step motor, receives a switching pulse, pinion 3 will turn through a certain angle and threaded spigot 7 will be axially displaced. If the displacement is such that the spring 13 is compressed, the pressure in the system will rise according to the number of pulses reaching the step motor. If, for instance, a pressure of 50 bar has been preselected, the electric motor 2 will move through so many steps that the valve closure member 14 is lifted from the valve seat 15 in the direction of the arrow P, when a pressure of 50 bar has been reached in the preliminary control duct 18. The oil will now flow from the preliminary control duct 18 into a chamber 19 and thence through a duct 20 and outwardly to a tank, not shown.

Should the pressure sink below the preset 50 bar, the valve closure member 14 will again be applied by the helical spring 13 to the valve seat 15, so that the valve is shut.

If the step motor 2 has been so moved, as a result of the received switching pulses, that the helical spring 13 is relieved, the pressure in the hydraulic system will drop to the value which corresponds to the preselected setting.

If the load is completely off the helical spring 13, the pressure in the hydraulic system will be zero. Yet the pressure medium will continue to flow through along the line 21. When the travel-limiting valve 16 is switched on, the preliminary control duct 18 is blocked in the direction of the helical spring 13 and the preset pressure at the pressure control valve becomes established in the hydraulic system.

Figure 2:
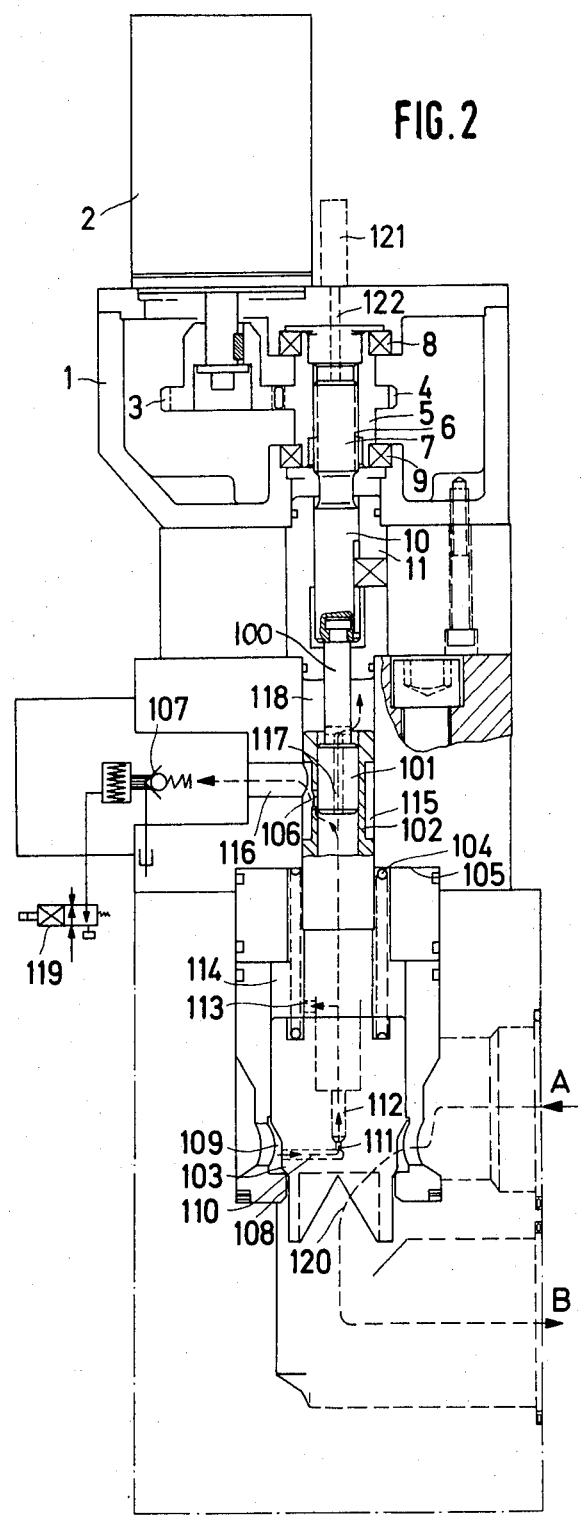
FIG. 2 is a schematic side view, in partial axial cross-section, of a quantity control valve in accordance with the invention.

The quantity control apparatus shown in FIG. 2 has a number of structural parts that completely coincide with those in the pressure valve shown in FIG. 1. These coincident parts are provided with identical reference symbols.

The motor 2 is flanged on to the housing 1 (FIG. 2), which receives the valve. The motor 2 drives, by means of the pinion 3, the teeth 4 of the nut 5, which co-acts through its inner thread 6 with the threaded spigot 7. The nut 5 is rotatably mounted in the housing 1 by means of the bearings 8, 9. The threaded spigot 7 is adapted to be axially movable with its mouth portion 10 in the bush 11, which is solidly fixed in the housing. The force end of month portion 10 is connected through a pin 100 to a position piston 101, which in its turn is longitudinally slidable in the sleeve 102. The sleeve 102 is firmly secured to the valve cone 103. This sleeve 102 constitutes the fundamental control element. It serves also for guiding the pressure spring 104, which is supported on one side on the stationary shoulder 10 and on the other on the valve cone 103.

The pressure medium—pressure oil in the present case—is supplied to the inlet A. If the electric motor 2, which may be constructed as a step motor, receives a pulse, the pinion 3 will turn through a certain angle and the threaded spigot 7 will be axially displaced by the nut 5, the axial displacement being governed by the transmission ratio and the pitch of the inner thread 6.

If the valve cone 103 is closed and the position piston 101 lies on a level with the control opening 106 in the sleeve 102 so that the edge of the position piston 101 precisely covers up the edge of the control opening 106, the valve is closed; it also stays closed if the edge of the position piston 101 does not cover up the control opening 106, but the non-return valve 107 is closed.

If the valve cone 103 is firmly applied to the valve seat 108, the hydraulic medium at the inlet A is on and reaches the annular chamber 109, which is formed in the valve casing by the step structure of the valve closure member 103. From the annular chamber 109, the pressure fluid flows through a radial connection 110 and the nozzle 111 and into the central conduit 112 in the valve cone 103. Through the radial duct 113, the oil enters the spring chamber 114 and exerts pressure, in addition to the pressure spring 104, on the valve cone 103. Moreover, the pressure medium flows through the control opening 106 in the annular chamber 115 and thence in the chamber until it reaches the non-return valve 107, which is closed. The pressure fluid further reaches, through the central through bore 117 in the position piston 101, the annular chamber 118. The valve is substantially at a pressure equilibrium and requires only a relatively small servo force to be moved.

If the threaded spigot 7 is moved upwards by the electric motor 2, the position piston 101 will also move up, clearing—according to the displacement—more or less the control opening 106. Despite that, the valve cone 103 remains closed until the travel-limiting valve 119 has been actuated. When the non-return valve 107 now opens, this causes the pressure in the spring chamber 114, annular chamber 115, annular chamber 118 and chamber 116 to drop, and the valve cone 103 is lifted off its valve seat 108 against the pressure of the pressure spring 104. The valve will now open up until the control opening is again covered by the edge of the position piston 101; from now on, the valve cone 103 will stay in the position preselected by the step motor.

Thus, if the step motor 2 has been so actuated by suitable switching pulses that the position piston 101 is moved stepwise up or down, the valve cone 103 will accurately follow the movement of the position piston 101, whose control edge is the control opening 106. In this way, a linear or progressive rise can be obtained. If the valve 119 is again switched on, the valve cone 103 will be immediately reapplied to its valve seat 108, as there is no longer any drop of pressure inside the valve.

With the valve open, the pressure fluid flows through the uncovered opening 120 to the outlet B.

The pacer or travel setter 121 with the metering pin 122 are not required if a step motor is used, as the axial movement is effected by pulses. If, though, the electric motor 2 is formed as a disc rotor, motor recourse must be had to the pacer 121 with the metering pin 122, to make accurate positioning possible. In this case, the metering pin 122 accurately follows the movement of the threaded spigot 7. This enables accurate regulation with return movement to be achieved, the play in the threading having no effect on the precision of positioning.

The invention is particularly suitable for application to die-casting machines operating on the multi-phase principle. It may, however, be employed to advantage in die-casting machines of different design as well as in injection moulding machines.

I claim:

1. A quantity control valve for controlling the quantity of a pressure medium comprising:
    (a) a valve-receiving housing (1) having a pressure medium inlet (A) and outlet (B) and an internal shoulder,
    (b) an electric motor (2) supported by the housing and capable of producing angular displacement in either sense of rotation,
    (c) a pinion (3),
    (d) a threaded nut (5) rotatably mounted within the housing and being driven by the motor through the pinion,
    (e) a bush (11) fixed in the housing,
    (f) a threaded spigot (7) coating with the nut and being axially movable relative to the bush,
    (g) a valve cone (103),
    (h) a sleeve (102) fixed to the valve cone and having a control opening (106) therethrough, (i) a position piston (101) connected to the spigot and being longitudinally slidable therewith and relative to the sleeve,
(j) a pressure spring (104) supported between the housing shoulder and the valve cone,
(k) a non-return valve (107),
(l) a valve seat (108) for the seating of the valve cone in closed position,
(m) a first annular chamber (109) in the housing,
(n) a central conduit (112) in the valve cone,
(o) a radial connection (110) and nozzle (111) connecting between the first annular chamber and control conduit,
(p) a radial duct (113) and connecting spring chamber (114),
(q) a second annular chamber (115),
(r) a third chamber (116),
(s) a central through bore (117), '(t) a fourth chamber (118),
(u) and means for pulsing the motor (2) for achieving pinion (3) rotation through a certain angle and axial displacement of the spigot (7) according to a transmission ratio as determined by the thread pitch of the nut (5),
all adapted and arranged for the stepwise movement of the position piston (101) and following movement of the valve cone (103) and covering of the control opening (106) by the position piston (101) in the attainment of a progressive rise with the valve cone (103) closing on the valve seat (108) in a valve closure mode and for the resultant passage of the pressure medium from the inlet (A) firstly to the first annular chamber (109) and the central conduit (112) and secondly via radial duct (113) into spring chamber (114) for pressurizing the valve cone (103) and thirdly via control opening (106) into second annular chamber (115) and third chamber (116) to the closed non-return valve (107) and fourthly via central through bore (117) to the fourth chamber (118) with the clearance of the control opening (106) being controlled by the movement of the position piston (101) responsively to the upward movement of the spigot (7) according to the driving of the motor (2) and with the valve cone (103) remaining closed until the travel limiting valve is actuated for the opening of the non-return valve (107) with consequent pressure drops in the spring chamber (114) and second annular chamber (115) and fourth annular chamber (118) and third chamber (116) and the lifting of the valve cone (103) from valve seat (108) against the pressure of pressure spring (104) for the covering of the control opening (106) by the position piston (101).

2. In the quantity control valve of claim 1 including:
a pacer (121),
and a metering pin (122), for following movement of the spigot (7) in facilitating accurate valve positioning.

* * * * *

UNITED STATES PATENT AND TRADEMARK OFFICE
CERTIFICATE OF CORRECTION

PATENT NO. : 4,239,179
DATED : December 16, 1980
INVENTOR(S) : Roland Geier

It is certified that error appears in the above-identified patent and that said Letters Patent are hereby corrected as shown below:

Column 3, line 35, delete "force" and insert --free-- therefor;

Signed and Sealed this

Seventh Day of April 1981

[SEAL]

Attest:

RENE D. TEGTMEYER

Attesting Officer     Acting Commissioner of Patents and Trademarks